April 28, 1959     B. W. SZNYCER     2,884,273
KNUCKLES OR ARTICULATED JOINTS OF THE CLEVIS TYPE
Filed Dec. 6, 1954
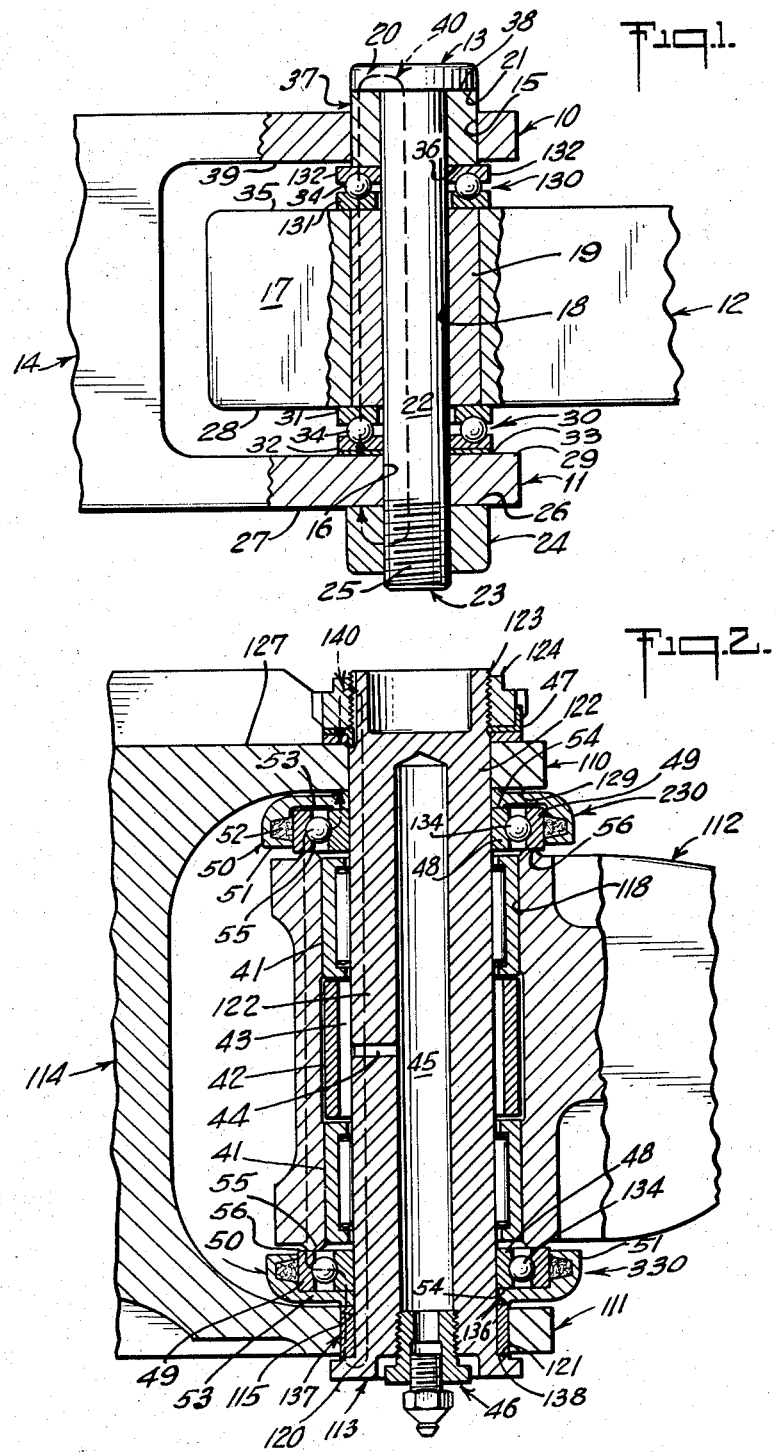

United States Patent Office 2,884,273
Patented Apr. 28, 1959

2,884,273
KNUCKLES OR ARTICULATED JOINTS OF THE CLEVIS TYPE

Bernard W. Sznycer, New York, N.Y., assignor to Omega Aircraft Corporation, New York, N.Y., a corporation of New York Application December 6, 1954, Serial No. 473,094

4 Claims. (Cl. 287—100)

The present invention relates to knuckles or articulated joints of the clevis type characterized by a pair of laterally-spaced elements or clevis arms between which is interposed another member and through all of which extends a pivot pin, the interposed member on the one hand and the laterally-spaced elements or arms on the other hand thereby being swingable relative to each other to provide an articulated joint structure.

A general object of the present invention is to provide in such articulated joint structure means which efficiently prevents the laterally-spaced elements or arms from being unduly stressed toward each other, either by manual adjustment when the clevis pin structure thereof is assembled or tightened up or in service due to outside temperature changes and such temperature changes as may result from frictional heat, such means assuring transfer of compressive force through the pin structure and the elements surrounding the latter exclusive of one of said clevis elements or arms, and to eliminate necessity for highly skilled assemblers now required in precision assembly of certain types of such joints.

A more specific object of the present invention is to provide in such articulated joint of the clevis type means intervening one of a pair of axially-spaced abutment means on the pin, e.g., its head and a nut thereon, and the inner face of one of said clevis elements or arms substantially rigid compression-opposing means extending through the pin hole of the other clevis element or arm so that when tightening means of said pin structure, such as its nut, is tightened up to foreshorten the effective length of the pin between its axially-spaced abutment means the second of the pair of the latter will be tightened toward the outer side of the first arm whereby the latter is clamped effectively between the compression-opposing means and the second of the pair of pin abutment means without clamping forces being applied to the second clevis element or arm and without stressing the latter toward the first clevis element or arm.

A further object of the present invention is to provide such an articulated joint structure of the clevis type which may be employed to advantage in high speed mechanisms such as the hub rotor assembly of helicopter rotor devices whereby the tendency to develop high frequency vibrations will not require precision adjustment of articulated joints thereof. Such service is frequently characterized by the employment of different metallic materials and light alloys having different coefficients of heat expansion and there is certain to be change in relative dimensions of parts due to variations attendant upon temperature change effects which may even result from development of frictional heat. Thus, prior to the present invention it was common to some of the assembly techniques practiced in constructing such devices to employ shims to assure elimination of axial looseness in such joints with attainment of the proper degree of tightening even when the closest of lengthwise manufacturing tolerances was carefully maintained. Only extreme caution exercised by a highly skilled assembler would prevent during the practice of such prior assembly techniques the use either of too many shims which would tend unduly to spread the clevis elements or arms apart or of too few shims which would permit application of severe bending stresses to one or more of those elements or arms and troublesome bending moments at the bases thereof. These and attendant difficulties characteristic of such use of joints of this type are effectively eliminated by the articulated joints of the present invention and permits practice of unusually large manufacturing tolerances.

Still another object of the invention is to provide in such joint structure compression-opposing means which includes spacer elements in the form of bearing seals which while serving to transfer compressive forces between the pair of pin abutment means during tightening also efficiently seal off the entire bearing assembly.

An additional object of the present invention is to provide structural embodiments of the device which are readily constructed and permit efficient use in operation thereof.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a plan view of a simplified embodiment of the present invention, with parts broken away and in section, shown to illustrate the basic principles thereof; and Fig. 2 is a plan view, with parts broken away and in section, of a particular embodiment of the present invention as designed for and used in high speed rotary mechanism, such as the rotor assembly of a helicopter for mounting the blades thereof to the hub structure.

Referring to the drawing, in which like numerals identify similar parts throughout, it will be seen that the simplified embodiment illustrated in Fig. 1 comprises a pair of laterally-spaced elements or members 10 and 11, an interposed element or member 12, and hinge pin structure 13 extending therethrough to secure relative swinging action of the members. The laterally-spaced elements 10 and 11 may constitute substantially parallel spaced arms of a bifurcated clevis member 14 and with the arm 10 having an enlarged aperture or through hole 15 and the arm 11 having a smaller aperture or through hole 16. The member 12 has a portion or end 17 provided with a through hole or bore 18 which may be of a diameter similar to that of the through hole 16, such bore preferably being the journal way through a bearing sleeve 19 fitted in a through hole in member 17.

The hinge pin 13 is provided with abutment means, preferably of a relatively fixed nature, e.g. in the form of an enlarged head 20 at one end with the head having an inner side 21 providing an abutment shoulder, and a shank 22 extending through the bore 18 and the hole 16 with the bore permitting relative rotary movement between the member 12 and the pin so that this member may swing about the pin. The other end 23 of the pin 13 is provided with a second abutment means 24 axially-spaced from the first and the pin structure includes any suitable movable tightening means to permit the axial distance between the pair of abutment means to be foreshortened. Preferably the second abutment means 24 is in the nature of an internally threaded nut threadably engaged with external male threads 25 on the pin shank end 23, and with the nut having an inside face 26 providing a second abutment shoulder abutted against the outside face 27 of arm 11. Thus nut 24 may also serve as the tightening means to attain the mentioned foreshortening.

Preferably there is interposed between one side 28 of the end 17 of member 12 and the inner side 29 of arm 11 a thrust bearing unit 30. The thrust bearing unit 30 may comprise an inner race ring 31 disposed about but free from the pin shank 22 while being abutted against the side 28 of member 12; an outer race ring 32 abutted against the inner side 29 of arm 11, with, if desired, an intervening washer or shim 33; and a plurality of bearing balls 34—34 seated in opposed race grooves of those inner and outer bearing rings as shown. While the inner race 31 is free from contact with pin shank 22 since the end 17 of member 12 is to swing with the pin preferably being relatively fixed, it is not necessary to so space the outer race ring 32 from the pin shank as the latter preferably remains fixed relative to the face 29 against which the outer race ring and the shim are abutted. A similar thrust bearing unit 130 preferably is mounted adjacent the other side 35 of the end 17 of member 12 with its outer race 132 abutted against the inner end 36 of sleeve means 37 extending through hole 15. The sleeve means 37 has its outer end 38 abutted against the inner pin head face 21 and is of such length that when intervened between the latter and bearing race 132 the pin head 20 is spaced outwardly or at least free from contact with arm 10 and this outer race is spaced inwardly from the inner side 39 of arm 10, as shown. Thus the bearing units 30 and 130, the end 17 of member 12 including its bearing sleeve 19, and the spacer sleeve 37, together form substantially rigid compression-opposing means interposed between the inner side 29 of the arm 11 and the pin head 20.

It will thus be seen that in use and operation of the articulated joint of the clevis type illustrated in Fig. 1, no clamping force is applied to the element or arm 10 but when the nut 24 is tightened up the arm 11 is clamped between it and the aligned bearing unit 30, the end 17 of member 12, the bearing unit 130, sleeve 37 and pin head 20. The transmittal of compressive force and opposing tension are illustrated in Fig. 1 by circuitous dash line 40, which illustrates transfer of some of the compression from the outside face 27 of arm 11 through the nut 24, counterbalancing tension through the pin shank 22 and the pin head 20, and the remainder of the compression back through the sleeve 37, bearing unit 130, member 12 and its bearing sleeve 19, bearing unit 30, and shim 33 to the inner face 29 of arm 11. Shim 33 is employed solely to permit the use of like bearing units at 30 and 130 while providing for the space between the outer race ring 132 of bearing unit 130 and the inner face 39 of arm 10. It will thus be seen that the parts can all be snugly tightened up together by turning down the nut 24 on the threaded end 23 of pin 13 without any particular care being required as to the amount of compressive force developed since the sleeve 37 prevents any of the compressive force from being applied to the clevis arm 10. Accordingly, no particular care need be required in the selection of any certain number of shims carefully to adjust distance between the clevis arms 10 and 11, as would be required if the bearing unit 130 was seated against or abutted to inner face 39 of arm 10 and without the employment of the spacer sleeve 37. It is thought to be apparent that the advantages of the present invention may be attained if the pin 13 is reversed with respect to members 10, 11 and 12, and spacer sleeve 37, so that the inner face 26 of nut 24 bears against the outer end 38 of the spacer sleeve with the inner face 21 of the pin head 20 bearing against the outer side 27 of member 11.

An embodiment of the invention illustrated in Fig. 1, as designed for use as the flap hinge structure in the rotor hub assembly of a helicopter, is illustrated in Fig. 2. The rotor hub structure has two blade mounts projecting laterally from diametrically opposite sides with a portion 114 of one shown as having a pair of laterally-spaced arms 110 and 111, between which is pivotally supported flap arm or link 112. Flap arm or link 112 is adapted to carry the drag or vertical hinge to which the propeller blade is mounted by a feathering hinge. For the flap hinge purpose, flap arm 112 is provided with a through hole or bore 118 in which is preferably mounted a suitable bearing sub-assembly intervening it and hinge pin 113. Such bearing sub-assembly may comprise two axially-spaced roller bearing units 41, 41, between which is interposed a spacer sleeve 42. The spacer sleeve 42 preferably has an inner diameter greater than the outer diameter of shank 122 of hinge pin 113 to provide an intervening oil space or chamber 43, communicated by a transverse duct 44 with an axial bore 45, provided as a socket in the headed end of pin shank 122 with the outer end of the socket fitted with a suitable lubrication fitting 46. The tightening means for the hinge pin 113 preferably is in the form of an internally threaded nut 124 threadably mounted on the externally threaded end 123 of the pin shank 122, with the employment of a lock washer structure 47 intervened between it and the outer face 127 of arm 110.

Thrust bearing units 230 and 330 are preferably of similar construction, and each may include an inner cylindrical race 48 and an outer cylindrical race 49 coaxially arranged thereabout, between which are interposed suitable rolling bearing elements, such as balls 134—134. Each of the bearing units 230 and 330 preferably includes a cup-shaped hood 50 having a peripheral flange 51 which surrounds the outer race 49 and to which it is sealed in a substantially lubricant-tight joint by means of a sealing ring 52 of felt or the like. Each cup-shaped hood 50 also includes a radial thrust-transmitting portion 53, preferably having contact only with the axially-outer edge 54 of the inner race 48. In the bearing unit 230 the radial thrust-transmitting portion 53 of the cup-shaped hood 50 preferably is abutted against the inner face 129 of the clevis arm 110. In the other thrust-bearing unit 330 the radial thrust-transmitting portion 53 of the cup-shaped hood 50 preferably is abutted against the inner end 136 of thrust sleeve structure, which may be in the form of a cylindrical sleeve 137.

The thrust sleeve 137 is slidably mounted in and through hole 115 of the other clevis arm 111 with its outer end 138 preferably abutted against an abutment shoulder provided by inner face 121 of an enlarged head 120 on the other end of hinge pin 113. It will be seen from Fig. 2 that the length of the hinge pin shank 122 between its abutment elements provided by the head 120 and the nut 124, the thickness of the clevis arm 111 and the length of the thrust sleeve 137 are such that the pin head 120 is spaced axially outward of this clevis arm with the bearing hood 50 of the bearing unit 330 spaced axially inward therefrom. As a consequence, thrust will be transmitted from the bearing unit 330 and its hood 50 through the thrust sleeve 137 to the pin head 120 without application of any transverse or lateral force to the clevis arm 111. It will be noted that while the inner races 48 of the two bearing units 230 and 330 have their axially-outer edges 54 abutting the radial portions 53 of the bearing hoods 50, preferably in approximately fluid-tight contact therewith, their axially-inner edges do not contact any structure, such as portions of the member 112 or the adjacent bearing units 41 mounted in the bore 118 of this member. However, the member 112 is provided on each side thereof with a circular land 55 about the bore 118 against which seats the axially-inner edge 56 of the outer race of each bearing unit 230 and 330 in approximately fluid-tight contact. This permits the simple thrust-transmitting hoods 50 of bearing units 230 and 330 effectively to seal off the entire bearing assembly, with lubricant being fed to the units and elements thereof via bore 45, duct 44 and chamber 43.

In employment of the articulated joint structure of the Fig. 2 embodiment, such as for the flap hinge in a helicopter rotor assembly, it is not necessary that the person assembling the parts be particularly skilled nor need to use extreme caution since no shimming technique is required and compressive stress applied to the parts when nut 124 is tightened down is not critical. Further, no compressive stress is applied to the clevis arms 110 and 111 with respect to each other between the pin head 120 and the nut 124. Tightening of nut 124 applies compressive force through the locknut structure 47 to the outer side 127 in opposition to tension along the pin shank 122 which is finally balanced by compressive force applied through the pin head 120, the thrust sleeve 137, radial portion 53 of the hood 50 of bearing unit 330, the inner race 48, balls 134–134 and outer race 49 of this bearing unit, the adjacent land 55 of member 112, then through the latter, and finally through the other land 55, the axially-inner edge 56 of outer race 49 of bearing unit 230, the balls 134–134, the inner race 48 and the radial portion 53 of the hood 50 of this latter bearing unit to the inner face 129 of the clevis arm 110. Such application of forces to opposite sides of the clevis arm 110 is indicated by the dash line 140 in Fig. 2 and it will be understood therefrom that no lateral or transverse force is applied to clevis arm 111 relative to the clevis arm 110, thereby avoiding setting up severe bending moments at the bases of these clevis arms with the application of excessive tightening force to the nut 124. Likewise, in so assembling the parts of the joint of Fig. 2, it is unnecessary to employ shimming of carefully selected thickness so as to insure that no axial looseness remains in the joint assembly, and the possibility of any undue spreading apart of the clevis arms 110 and 111 by the improper selection of too thick shimming is avoided. Such knuckle or articulated joint structure of the clevis type has been found to be of extreme practical value for both the flap and the vertical or drag hinge joints of helicopter rotor assemblies and such use thereof has been found to avoid the necessity of close manufacturing tolerances axially of such joints.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Articulated joint of the clevis type comprising, in combination; a bifurcated clevis member having laterally-spaced arms provided with substantially aligned transverse holes for reception therethrough of a hinge pin, a second member having an end interposed between said clevis arms and provided with a transverse bore substantially aligned with said arm holes, a hinge pin extending through the arm holes and said bore for relative swing of said bifurcated clevis member and said second member, said pin having on one end a head abutment element and on its other end a tightening nut abutment element with one of said abutment elements located beyond the outer side of a first one of said clevis arms and the other of said abutment elements abutting toward the outer side of the second of said clevis arms, thrust bearing means surrounding said pin interposed between the inner side of said second arm and one side of the end of said second member, sleeve means about said pin mounted through the hole of said first clevis arm for relative free sliding motion in opposite axial directions and abutted against said pin head, and second thrust bearing means interposed between said sleeve means and the other side of said second member end while being free of contact with said first clevis arm; said sleeve means, said second bearing means, said second member end and said first bearing means constituting a compression-opposing assembly of successively arranged and abutted means clamped between said pin head and the inner side of said second arm by abutment of said nut toward the outer side of said second arm.

2. Articulated joint of the clevis type comprising, in combination; a member having a pair of laterally-spaced arms provided with aligned through holes, a second member interposed between said arms and having a transverse bore aligned with the holes in the latter, a hinge pin rotatably mounted through said bore with the ends thereof extending through said arm holes and having on one end an enlarged head abutment element and on the other end an axially-movable tightening nut abutment element with one of said abutment elements applying compressive force to the outer side of one of said arms, a thrust bearing unit interposed between the latter arm and one side of said second member, thrust sleeve structure slidably mounted through the hole in the other of said arms and backed by the other of said pin abutment elements, and a second thrust bearing unit interposed between said other side of said second member and said thrust sleeve structure with the latter spacing said second thrust bearing unit from said second arm.

3. The articulated joint as defined in claim 2 characterized by each of said thrust bearing units comprising inner and outer coaxially-arranged cylindrical races and interposed rolling means with the circumferential axially-inner edge of the outer race being seated against side surfaces of said second member in snug contact therewith preventing appreciable leakage of lubricant, each of said bearing units including a cup-shaped hood having a peripheral flange sealed to the outer race and a radial thrust-transmitting portion interposed between the circumferential axially-outer edge of the inner race and adjacent structure, said adjacent structure on one side of said second member being provided by the inner side of the first arm and on the other side of said second member by the inner end of said thrust sleeve structure.

4. An articulated joint of the clevis type comprising, in combination, a pair of laterally spaced arms having transverse apertures, an apertured element interposed between said arms for swing relative thereto, a hinge pin extending through the apertures in said arms and in said element, said pin having take-up clamping means including means forming abutment shoulders at the respective pin ends, thrust bearings carried by said pin in spaces between each inner side of said space darms and said apertured element, the end of one of said arms being clamped firmly by one abutment shoulder to said apertured element through one of said intervening thrust bearings when a clamping force is exerted by said clamping means, the other arm being held free of such clamping force by a spacer sleeve passing through the aperture in said other arm, said sleeve being located in abutment with said other thrust bearing and with the abutment shoulder at the other pin end, and holding said bearing and said abutment shoulder spaced away from and out of contact with said other arm.

References Cited in the file of this patent

UNITED STATES PATENTS

| | | |
|---|---|---|
| 1,008,048 | Mueller | Nov. 7, 1911 |
| 1,408,213 | Locke | Feb. 28, 1922 |
| 1,414,737 | Gulick | May 2, 1922 |